(12) United States Patent
Molina et al.

(10) Patent No.: US 12,228,519 B2
(45) Date of Patent: Feb. 18, 2025

(54) METHOD AND SYSTEM FOR DETECTING AND AUTHENTICATING A TAGGANT IN A MARKING VIA SURFACE-ENHANCED RAMAN SPECTROSCOPY

(71) Applicant: SICPA HOLDING SA, Prilly (CH)

(72) Inventors: Aldric Molina, Cossonay (CH); James Brewster, Albuquerque, NM (US)

(73) Assignee: SICPA HOLDING SA, Prilly (CH)

( * ) Notice: Subject to any disclaimer, the term of this patent is extended or adjusted under 35 U.S.C. 154(b) by 206 days.

(21) Appl. No.: 18/016,627

(22) PCT Filed: Jul. 13, 2021

(86) PCT No.: PCT/EP2021/069522
§ 371 (c)(1),
(2) Date: Jan. 17, 2023

(87) PCT Pub. No.: WO2022/013252
PCT Pub. Date: Jan. 20, 2022

(65) Prior Publication Data
US 2023/0314329 A1 Oct. 5, 2023

Related U.S. Application Data

(60) Provisional application No. 63/052,695, filed on Jul. 16, 2020.

(51) Int. Cl.
*G01N 21/65* (2006.01)
(52) U.S. Cl.
CPC .................. *G01N 21/658* (2013.01)

(58) Field of Classification Search
CPC .................. G01N 21/658; G07D 7/1205
See application file for complete search history.

(56) References Cited

U.S. PATENT DOCUMENTS

| 10,417,856 B2 | 9/2019 | Clara et al. |
| 2007/0165209 A1 | 7/2007 | Natan et al. |
| 2008/0189066 A1 | 8/2008 | Miller |

(Continued)

OTHER PUBLICATIONS

Charles L. Lawson and Richard J. Hanson, Solving Least Square Problems, SIAM, 1995, 352 pages.

(Continued)

*Primary Examiner* — Tarifur R Chowdhury
*Assistant Examiner* — Akbar H. Rizvi
(74) *Attorney, Agent, or Firm* — MUNCY, GEISSLER, OLDS & LOWE, P.C.

(57) ABSTRACT

The invention relates to a method, and a corresponding system, capable of checking whether genuine SERS or SERRS taggants having a unique characteristic surface enhancement scattering feature are present or not on a machine-readable marking applied on a value document by using a Raman spectrometer adapted to perform a Raman Spectroscopy analysis of the marking. The method according to the invention allows a reliable and fast detection of a presence of the SERS/SERRS taggants, and is particularly suitable for checking authenticity of value documents, e.g. such as banknotes, moving with respect to the Raman spectrometer with a given speed, and possibly with a high speed, or briefly exposed to the Raman spectrometer.

12 Claims, 6 Drawing Sheets

(56) References Cited

U.S. PATENT DOCUMENTS

2015/0064705 A1* 3/2015 Ricketts .............. G01N 21/658
435/6.12
2017/0358163 A1 12/2017 Clara et al.

OTHER PUBLICATIONS

Zhi-Min Zhang et al: "An intelligent background-correction algorithm for highly fluorescent samples in Raman spectroscopy", Journal of Raman Spectroscopy, vol. 14, No. 6, Oct. 9, 2009, pp. 659-669.
Bangladesh Examination Report issued with respect to Bangladesh application No. 212/2021, Aug. 7, 2021, 1 page.
International Search Report, Written Opinion of ISA and International Preliminary Report on Patentability issued with respect to application No. PCT/EP2021/069522.

* cited by examiner

METHOD AND SYSTEM FOR DETECTING AND AUTHENTICATING A TAGGANT IN A MARKING VIA SURFACE-ENHANCED RAMAN SPECTROSCOPY

TECHNICAL FIELD

The present invention relates to the technical field of detection of taggants present in a marking on a substrate (e.g. a banknote) by means of Surface-Enhanced Raman Spectroscopy (SERS) or by means of Surface-Enhanced Resonance Raman Spectroscopy (SERRS). The taggant is of SERS type or of SERRS type and thus has unique characteristic surface enhancement feature, (i.e. respectively a surface-enhanced Raman scattering feature or a surface-enhanced resonance Raman scattering feature), that allows using a standard Raman spectrometer for its detection.

BACKGROUND OF THE INVENTION

As well known to the skilled person, a SERS or SERRS taggant comprises an aggregate of nanoparticles presenting a plasmonic surface and Raman active reporter molecules adsorbed on the surface of the nanoparticles. The nanoparticles presenting a plasmonic surface are responsible for the generation of the electric field required for the Raman amplification, while the Raman active reporter molecules provide the unique vibrational fingerprint of the SERS taggant. A SERS or SERRS taggant may further comprise an external coating layer isolating the nanoparticles aggregate having adsorbed on the surface Raman active molecules from the external medium. Thus, the external coating layer a) isolates the SERS/SERRS taggant from the external medium, thereby preventing the Raman active reporter molecules from leaching out from the SERS/SERRS taggant and protecting the SERS/SERRS taggant from contaminations of the external medium that may give rise to spurious peaks, b) increases the colloidal stability of the SERS/SERRS taggant, and c) provides a convenient surface for further chemical functionalization. External coating layers include silica and polymers, such as poly(ethylene imine) (PEI), poly(styrene-alt-maleic acid) sodium salt (PSMA), poly (diallyldimethylammonium chloride) (PDADMAC).

Raman spectroscopy is widely used for quantitative pharmaceutical analysis, but a common obstacle to its use is that the sample fluorescence generally masks the scattered Raman signal due to the fact that the Raman signal has a much shorter duration than the fluorescence signal, as illustrated in FIG. 1 wherein a Raman intensity signal (10) (relative intensity values) due to an illumination with a 600 ps laser pulse (a gate of 1 ns is shown with vertical doted lines), and various luminescence (fluorescence) intensity signals (11, 12, 13 and 14) are shown (respectively, with 1 ns, 5 ns, 10 ns and 50 ns lifetimes). Time-gating is known to provide an instrument-based method for rejecting most of fluorescence signal through temporal resolution of the spectral signal and allows Raman spectra of fluorescent materials to be obtained. An additional practical advantage is that spectral signal analysis is possible even in ambient lighting. Conventional partial least-squares (PLS) regression allows spectral signal quantification, with Raman-active time domain selection (based on visual inspection) that improves performance. Model performance has been further improved by using kernel-based regularized least-squares (RLS) regression with greedy feature selection (i.e. "forward selection" by selecting the best features one by one, or "backward selection" by removing worst features one by one) in which the data use in both the Raman shift and time dimensions is statistically optimized. Overall time-gated Raman spectroscopy, especially with optimized data analysis in both the spectral and time dimensions, shows potential for sensitive and relatively routine quantitative analysis of photoluminescent materials (e.g. pharmaceuticals during drug development and manufacturing).

Raman spectra are obtained by measuring the intensity distribution of Raman scattered photons, received from a substrate including a substance of interest and illuminated by a monochromatic light source, as a function of wavelength. Quantitative determination is based on the concentration of the substance of interest being proportional to the integrated intensity of its characteristic Raman bands. However, overlapping peaks of different compounds in a mixture present on the substrate and experimental effects that are not related to the sample concentration generally complicate the signal analysis. In such cases, multivariate analysis, where a large amount of spectral data can be included, is more reliable than methods where only one or a few spectral features are considered. Several multivariate methods have been established for the interpretation of Raman spectra. The aims of such methods are to (i) extract spectral information that quantifies the substance of interest, (ii) estimate the uncertainties of the quantification, and (iii) evaluate the performance of the built model.

Partial least-squares (PLS) regression is one of the most widely used chemometric methods for quantitative analysis of spectra. PLS links the information in two data matrices, X (e.g., the spectral variation) and Y (e.g., the sample composition), in a multivariate model by maximizing their covariance. Kernel-based regularized least-squares (kernel-based RLS) regression is another approach that has the ability to learn functions from the nonlinear data features which, when combined with feature selection algorithms such as greedy forward feature selection, optimizes the use of information provided by the data features. PLS and RLS are quite similar in that they aim to shrink the solution away from the ordinary least-squares solution toward the directions of the variable space of large sample spread with lower variability.

Known error sources in the quantitative analysis of powder mixtures using Raman spectroscopy include intra- and inter-day variation of the Raman instrument, changes in room temperature and humidity, sample fluorescence, mixing, packing, and positioning, as well as sample particle size and compactness. While most issues can be addressed with suitable spectral processing and data analysis approaches, complete subtraction of fluorescence without any instrument-based methods is difficult, even with sophisticated algorithms.

Moreover, the measured Raman spectrum is masked by a strong fluorescence background in many of the potential applications. The reason for this is that the probability of Raman (cross-sectional) scattering is much lower than that of fluorescence. In other words, Raman scattering and fluorescence emission are two competing phenomena and the spectrum is dominated by the most likely phenomenon, which is typically fluorescence, and thus it will induce a continuous background to the residual spectrum and especially increase the photon shot noise degrading the signal-to-noise ratio resulting in uncertainty in the case of both material identification and concentration measurements.

However, Raman and fluorescence scattered photons have different lifetimes. Raman photons are observed quite instantly during excitation (with laser light), whereas fluorescence photons can still be detected after nanoseconds or even milliseconds, and thus the fluorescence background can be suppressed if scattered photons are collected only during the short Raman scattering phase. This can be achieved by illuminating the sample with short, intense laser pulses (with pulse width much smaller than the fluorescence lifetime) rather than the traditional continuous wave ("CW") radiation and recording the sample response only during these short pulses. Thus, by synchronizing the measurement to the period of the laser pulse, the probability of detecting fluorescence photons can be reduced, since these are mostly emitted after the Raman scattered photons. Furthermore, the accuracy of the baseline of the Raman spectrum is improved, which also leads to greater accuracy in both material identification and quantitative analysis. A synchronization (or gating) signal is a digital signal or pulse (sometimes called a "trigger") that provides a time window so that a particular event or signal from among many ones will be selected and others will be eliminated or discarded.

Synchronization can be realized with various detection systems such as time-resolved photomultiplier tubes, high-speed optical shutters based on a Kerr cells intensified charge-coupled devices, quantum dot resonant tunneling diodes, and complementary metal-oxide semiconductor single-photon avalanche diodes (CMOS SPADs). One of the essential advantages of CMOS SPADs is the ability to reject both the photoluminescence tail and the photon noise. SPADs are realized in standard CMOS technology and contain a p-n junction which is reverse-biased above its breakdown voltage, meaning that entry of even a single photon can trigger avalanche breakdown that can then be recorded. The width and position of the time gate need to be properly selected. The current CMOS Single-Photon Avalanche Diodes are compact and inexpensive while being able to achieve adequate temporal resolutions (sub-nanosecond). CMOS SPAD detectors have been used to evaluate fluorescence lifetimes. More recently the applicability of CMOS SPADs for fluorescence rejection in Raman spectroscopy of pharmaceutical products has also been demonstrated.

Some earlier studies have implemented this "time-gating" technique by means of a high-speed optical shutter based on a Kerr cell or a mode-locked laser with a spectrograph and intensified CCD (ICCD, "Intensified Charged Coupled Device"). In addition, some analysis has been done to ascertain the proper gate position of ICCD and CCD for achieving the best fluorescence rejection efficiency. However, these devices are either highly sophisticated, physically large and expensive, or capable of measuring only a single wavelength band of the spectrum at a time, so that they require long measurement times and are thus unsuitable for on-site applications, and cannot be used in case of samples moving relative to the Raman spectrometer. To overcome these problems the CCDs and ICCDs should be replaced with more suitable detectors.

Problems arise when using a Raman spectrometer for the authentication of a SERS taggant or a SERRS taggant present in a marking (e.g. a pattern printed with an ink containing the SERS/SERRS taggant) applied on a value document, e.g. a banknote. More specifically, the spectrum measured by the Raman spectrometer includes the taggant "fingerprints" (i.e. unique identifying spectral characteristics of the taggant) as well as additional interferences or background information. SERS or SERRS taggant (spectral) fingerprints comprise vibrational bands which are represented by multiple peaks having a shape of a Gaussian/Lorentzian distribution at different locations in the spectrum and different widths. Locations of the peaks in the spectrum are not absolute and will depend on the wavelength of the laser excitation light (due to a shift from the laser wavelength). The Raman and SERS/SERRS signals are different physical effects than the fluorescence: the substrate of the value document (e.g. the paper of a banknote) as well as the marking (e.g. inks present on the banknote) have fluorescence spectra that can be measured by a Raman spectrometer. In case different inks (e.g. multiple printings on a banknote), substrates (e.g. papers) and taggants are present in a same measurement track of the spectrometer, the resulting spectral contents are cumulative. A measurement from the Raman spectrometer is thus generally composed of multiple spectral information coming from cumulative effects. Some of the spectral information are known ("known spectral data"), such as the ink, the paper, the taggant, and are stable along the time (depending on the banknote design). However, some of the spectral information are unknown ("unknown spectral data") and due to (varying) external conditions during the measurement process, such as, for example, contaminating fumes (e.g. presence of human perspiration, or even beer, or food traces . . . ) or presence of stains on a support of the taggants etc. These unknown spectral information are added during the circulation of the banknote and cannot be anticipated. Moreover, such problems are even more relevant in case the measurement is performed on a value document moving at high speed necessitating very short integration times (e.g. 100-500 µs), like for example in case of a banknote transported at several m/s (e.g. 10-12 m/s or higher) in a banknote sorting device, while having a high spatial resolution (e.g. of few millimeters).

In such drastic conditions, existing prior art solutions involve, e.g. as disclosed in U.S. Pat. No. 10,417,856 B2, using a great number (i.e. 100 or more) of spectral channels for measuring the whole Raman spectrum together with a small entrance slit (the higher the spectral resolution is, the smaller the slit has to be and then, there is less light onto the CCD sensor) possibly coupled with light-absorbent walls (for partly absorbing disturbing Rayleigh-scattered excitation light) in the Raman spectrometer. The problem addressed in this patent is the situation where composed banknotes have to be authenticated by detecting a SERS spectrum of a security taggant. The disclosed solution is to map out the full note by using multiple small measurements along the note transport. This requires few hundreds of microseconds of integration time, and a consequence is that the readable signals are very low at this regime (this is why a compromise on the spectral resolution is necessary). An improved discrimination between the Raman spectrum of the taggant and the spectra due to other components of the banknote is disclosed in US 2007/0165209 A1. However, there is still a need for a faster detection of a Raman spectrum with a higher signal level in order to provide a more reliable diagnostic.

SUMMARY OF THE INVENTION

The invention relates to a method, and a corresponding system, capable of checking whether genuine SERS or SERRS taggants having a unique characteristic surface enhancement feature are present or not on a machine-readable marking applied on a value document (e.g. a banknote, or a label, with a marking printed with an ink containing taggants) by using a Raman spectrometer adapted to perform a Raman Spectroscopy (RS) analysis of the marking. The invention can be used for authenticating a value document, or an item, marked with SERS or SERRS taggants according to various processes, for example:

the taggant(s) can be present within a part of a substrate of the value document or item, in a certain area: for example, in case of a paper substrate (e.g. a banknote), the taggant can be fixed on the fibers of the paper in said area. In this case, the marking containing the taggant(s) is the portion of the substrate that is impregnated with said taggant(s).

the taggant(s) can be mixed with an ink that is printed on a certain area of a substrate of the value document or item. In this case, the marking containing the taggant(s) is the portion on the substrate that is printed with the ink containing said taggant(s).

the taggant(s) can be mixed with a material, e.g. a varnish, that is applied on a certain area of a substrate of the value document or item (e.g. as a layer). In this case, the marking containing the taggant(s) is the portion on the substrate on which the material is applied.

the taggant(s) can be mixed with a specific material of a coating layer applied on a plastic support.

In all cases, the marking applied on the value document or item comprises a material (e.g. the portion of the substrate itself that contains tagged fibers, or the ink printed on the substrate, or the layer of varnish applied on the substrate . . . ) that includes SERS or SERRS taggant(s).

The method according to the invention allows a reliable and fast detection of a presence of genuine SERS or SERRS taggants, and is particularly suitable for checking authenticity of value documents marked with said taggants, e.g. such as banknotes, that are moving with respect to the Raman spectrometer with a given speed, and possibly with a high speed (e.g. 10 m/s or more), or only briefly exposed to the Raman spectrometer (e.g. like in sorting machines).

In order to overcome the above mentioned drawbacks of the prior art, the invention relates to a method of authenticating a marking applied on a substrate and having a composition comprising a first material including a SERS taggant, or a SERRS taggant, the method comprising the steps of:

defining a full model of a Raman spectrum of a genuine marking applied on a genuine substrate and having a composition comprising a genuine first material including a genuine SERS taggant, or a genuine SERRS taggant, as a first weighted sum of a reference Raman spectrum of the genuine taggant, a reference Raman spectrum of a reference genuine substrate that is not marked with the genuine taggant, and a reference Raman spectrum of a reference genuine first material not including the genuine taggant, collected upon respective illumination of the genuine taggant, the reference genuine substrate, and the reference genuine first material with excitation light;

defining a reduced model of a Raman spectrum of a reduced marking, the reduced marking differing only from the genuine marking by its composition not including the genuine taggant, as a second weighted sum of the reference Raman spectrum of the reference genuine substrate, and the reference Raman spectrum of the reference genuine first material;

upon illuminating the marking with the excitation light, measuring a corresponding Raman light signal scattered by the marking via a Raman spectrometer to obtain a measured Raman spectrum of the marking;

fitting the measured Raman spectrum with the full model of the Raman spectrum by calculating values of the weights in the full model that minimize, under non-negativity constraint of said weights, a difference between the full model and the measured Raman spectrum and obtaining a corresponding first residual;

fitting the measured Raman spectrum with the reduced model of the Raman spectrum by calculating values of the weights in the reduced model that minimize, under non-negativity constraint of said weights, a difference between the reduced model and the measured Raman spectrum and obtaining a corresponding second residual;

calculating a F-value corresponding to a F-test of comparison of the full model and the reduced model for the measured Raman spectrum from the obtained first residual and second residual; and deciding whether the taggant is present or not in the marking based on the calculated F-value.

Thus, in case the F-value is compatible with a presence of a genuine SERS or SERRS taggant in the tested marking, the marking is considered as genuine. In case the F-value is not compatible with a presence of a genuine SERS or SERRS taggant in the tested marking, the marking may be considered as counterfeited or at least suspicious. The reference genuine substrate differs only from the genuine substrate by being not marked with the genuine (SERS or SERRS) taggant. Similarly, the reference genuine first material differs only from the genuine first material by not including the genuine (SERS or SERRS) taggant. Of course, in case the marking to be checked is in fact genuine, its first material and its taggant also corresponds to the genuine first material including the genuine taggant. The above mentioned reference genuine substrate denotes a corresponding genuine substrate without the marking (e.g. a paper substrate of a banknote before it is printed), and the reference genuine first material denotes a corresponding genuine first material without any inclusion of a taggant.

The method according to the invention is particularly adapted to a case in which, during the operation of measuring the Raman light signal scattered by the marking, the marking is moving relative to the Raman spectrometer.

In the above method, the composition of the marking may include a second material and the respective weighted sums of the full model and the reduced model may further include a reference spectrum of a corresponding genuine second material, collected upon illumination of said genuine second material with the excitation light, with corresponding weight. Said second material (e.g. an ink) is generally distinct from the first material including the taggant, and does not include the taggant.

In a preferred mode, the Raman spectrometer has a plurality of spectral channels and the operation of measuring the Raman light signal scattered by the marking comprises:

dispersing the collected Raman light in the plurality of spectral channels and acquiring a two-dimensional digital image of the dispersed spectral data with an imaging unit;

pre-processing the acquired two-dimensional digital image by performing with a processing unit equipped with a memory the operations of:

transforming the two-dimensional spectral data into a one-dimensional spectral data via line binning and conversion of binned data into wavelength data;

resampling the one-dimensional spectral data to obtain a one-dimensional spectrum with data points equally distant in wavelength;

calibrating the one-dimensional spectrum with respect to a reference white light spectrum stored in the memory to obtain a calibrated spectrum;

filtering with a low-pass filter the calibrated spectrum to obtain a filtered spectrum; and aligning in wavelength the filtered spectrum with the reference spectrum of the taggant stored in the memory, thereby obtaining a pre-processed spectrum; and performing the operations of calculating the first residual and the second residual by using the pre-processed spectrum as the measured Raman spectrum.

The optics and the grating of a Raman spectrometer cause typical (two-dimensional) deformation of the Raman lines formed on the two-dimensional image (Raman lines are curved and compressed). The operations of line binning and calibration are performed to compensate said deformation of the Raman lines. The operation of calibration is generally performed with an (reference) excitation light delivered by an Argon lamp in order to calculate the two-dimensional deformation of the Raman lines by comparison with the observed image of the Argon lines.

According to the above preferred mode, the method may comprise:

defining a spectrum measurement vector as a vector corresponding to the obtained pre-processed spectrum;

defining a first spectrum vector as a product of a first weight vector and a full design matrix and determining respective non-negative components of the first weight vector that minimizes via a least square method a first residual vector corresponding to a difference between said first spectrum vector and the spectrum measurement vector, the full design matrix having columns respectively representing the reference spectral data of the full model;

defining a second spectrum vector as a product of a second weight vector and a reduced design matrix and determining respective non-negative components of the second weight vector that minimizes via a least square method a second residual vector corresponding to a difference between said second spectrum vector and the spectrum measurement vector, the reduced design matrix having columns respectively representing the reference spectral data of the reduced model;

calculating a first residual sum of squares RSS1 of errors corresponding to the first weight vector, the first weight vector having a number p1 of non-negative components;

calculating a second residual sum of squares RSS2 of errors corresponding to the second weight vector, the second weight vector having a number p2 of non-negative components; and calculating the F-value as a ratio of a difference between the second residual sum of squares RSS2 and the first residual sum of squares RSS1 divided by a difference between the numbers p2 and p1, and the first residual sum of squares RSS1 divided by a difference between a number N of components of the spectrum measurement vector and the number p1, $F=((RSS2-RSS1)/(p1-p2))/(RSS1/(N-p1))$.

Moreover, the operations of determining respective non-negative components of the first weight vector and the second weight vector may comprise representing the first weight vector minimizing the first residual vector as a product of a pseudo-inverse matrix of the full design matrix and the spectrum measurement vector, and representing the second weight vector minimizing the second residual vector as a product of a pseudo-inverse matrix of the reduced design matrix and the spectrum measurement vector; and in case a component of, respectively, the first weight vector or the second weight vector has a negative value:

modifying, respectively, the full design matrix or the reduced design matrix by removing from said matrix a spectral vector corresponding to said negative component;

setting to zero of said negative value component; and recalculating, respectively, a pseudo-inverse matrix of the modified full design matrix or the modified reduced design matrix, until the obtained components of the first weight vector and the second weight vector have only non-negative values.

The invention further relates to a system operable to implement the steps of the above mentioned method, the system for authenticating a marking applied on a substrate and having a composition comprising a first material including a SERS taggant, or a SERRS taggant, the system comprising a light source, a Raman spectrometer, an imaging unit and a control unit having a processing unit and a memory, the light source being controlled by the control unit via a current loop to deliver a calibrated excitation light, the system being configured to perform the operations of:

illuminating the marking with the excitation light delivered by the light source controlled by the control unit; and collecting a resulting Raman light from the marking, and dispersing the collected Raman light in the Raman spectrometer having a plurality of spectral channels and acquiring a two-dimensional digital image of the corresponding spectral data with the imaging unit, and storing in the memory the acquired spectral data as a measured Raman spectrum of the marking; wherein the memory stores a full model of a Raman spectrum of a genuine marking applied on a genuine substrate and having a composition comprising a genuine first material including a genuine SERS taggant, or a genuine SERRS taggant, as a first weighted sum of a reference Raman spectrum of the genuine taggant, a reference Raman spectrum of a reference genuine substrate that is not marked with the genuine taggant, and a reference Raman spectrum of a reference genuine first material not including the genuine taggant collected upon respective illumination of the genuine taggant, the reference genuine substrate, and the reference genuine first material with excitation light;

the memory stores a reduced model of a Raman spectrum of a reduced marking, the reduced marking differing only from the genuine marking by its composition not including the genuine taggant, as a second weighted sum of the reference Raman spectrum of the reference genuine substrate, and the reference Raman spectrum of the reference genuine first material; and the system being further configured to perform via the processing unit the operations of:

fitting the measured Raman spectrum stored in the memory with the stored full model of the Raman spectrum by calculating values of the weights in the full model that minimize, under non-negativity constraint of said weights, a difference between the full model and the measured Raman spectrum and obtaining, and storing in the memory, a corresponding first residual;

fitting the measured Raman spectrum stored in the memory with the stored reduced model of the Raman spectrum by calculating values of the weights in the reduced model that minimize, under non-negativity constraint of said weights, a difference between the reduced model and the measured Raman spectrum and obtaining, and storing in the memory, a corresponding second residual;

calculating, and storing in the memory, a F-value corresponding to a F-test of comparison of the full model and the reduced model for the measured Raman spectrum from the stored first residual and second residual; and deciding whether the taggant is present or not in the marking based on the stored F-value, and delivering a signal indicating a result of the decision.

In a preferred embodiment of the system, wherein during the operation of measuring the Raman light signal scattered by the marking, the marking is moving relative to the Raman spectrometer, the control unit synchronizes the illumination of the marking with the light source and the acquisition of the measured Raman spectrum via the Raman spectrometer and the imaging unit with the motion of the marking.

In the above system, in case the composition of the marking includes a second material, the respective weighted sums of the full model and the reduced model further include a reference spectrum of a corresponding genuine second material, collected upon illumination of said genuine second material with the excitation light and stored in the memory, with corresponding weight. For example, in case of a printed marking, said genuine second material may correspond to a set of inks used for printing the marking but not including the SERS, or SERRS, taggant.

In the above system, the processing unit may be configured to perform the operations of pre-processing the stored two-dimensional digital image by
transforming the two-dimensional spectral data into a one-dimensional spectral data via line binning and conversion of binned data into wavelength data;
resampling the one-dimensional spectral data to obtain a one-dimensional spectrum with data points equally distant in wavelength;
calibrating the one-dimensional spectrum with respect to a reference white light spectrum stored in the memory to obtain a calibrated spectrum;
filtering with a low-pass filter the calibrated spectrum to obtain a filtered spectrum;
aligning in wavelength the filtered spectrum with the reference spectrum of the taggant stored in the memory, thereby obtaining, and storing in the memory, a pre-processed spectrum; and
performing the operations of calculating the first residual and the second residual by using the pre-processed spectrum stored in the memory as the measured Raman spectrum.

Moreover the processing unit may be further configured to:
define a spectrum measurement vector as a vector corresponding to the obtained pre-processed spectrum;
define a first spectrum vector as a product of a first weight vector and a full design matrix and determine respective non-negative components of the first weight vector that minimizes via a least square method a first residual vector corresponding to a difference between said first spectrum vector and the spectrum measurement vector, the full design matrix having columns respectively representing the reference spectral data of the full model;
define a second spectrum vector as a product of a second weight vector and a reduced design matrix and determine respective non-negative components of the second weight vector that minimizes via a least square method a second residual vector corresponding to a difference between said second spectrum vector and the spectrum measurement vector, the reduced design matrix having columns respectively representing the reference spectral data of the reduced model;
calculate a first residual sum of squares RSS1 of errors corresponding to the first weight vector, the first weight vector having a number p1 of non-negative components, and storing in the memory the calculated first residual sum of squares RSS1 and the number p1;
calculate a second residual sum of squares RSS2 of errors corresponding to the second weight vector, the second weight vector having a number p2 of non-negative components, and storing in the memory the calculated second residual sum of squares RSS2 and the number p2; and
calculate the F-value as a ratio of a difference between the stored second residual sum of squares RSS2 and the stored first residual sum of squares RSS1 divided by a difference between the stored numbers p2 and p1, and the stored first residual sum of squares RSS1 divided by a difference between a number N of components of the spectrum measurement vector and the number p1, $F=((RSS2-RSS1)/(p1-p2))/(RSS1/(N-p1))$.

The processing unit may further be configured to determine respective non-negative components of the first weight vector and the second weight vector by
representing the first weight vector minimizing the first residual vector as a product of a pseudo-inverse matrix of the full design matrix and the spectrum measurement vector;
representing the second weight vector minimizing the second residual vector as a product of a pseudo-inverse matrix of the reduced design matrix and the spectrum measurement vector; and
in case a component of, respectively, the first weight vector or the second weight vector has a negative value:
modifying, respectively, the full design matrix or the reduced design matrix by removing from said matrix a spectral vector corresponding to said negative component;
setting to zero of said negative value component; and
recalculating, respectively, a pseudo-inverse matrix of the modified full design matrix or the modified reduced design matrix, until the obtained components of the first weight vector and the second weight vector have only non-negative values and storing the obtained components in the memory.

The present invention will be described more fully hereinafter with reference to the accompanying drawings, in which prominent aspects and features of the invention are illustrated.

DETAILED DESCRIPTION

In order to overcome the above mentioned drawbacks of the prior art and detect the presence of a SERS taggant, or a SERRS taggant, in a marking applied on a substrate to be authenticated, and also reliably quantify the amount of signal coming from the SERS/SERRS taggant fingerprints (i.e. very specific peaks on their Raman spectra) within raw spectral data from the marking measured by a Raman spectrometer, the method according to the invention compares the measured spectral data from the tested marking with reference Raman spectral models of the various separate materials forming a corresponding genuine marking, and a reference Raman spectrum of a reference genuine substrate, and uses a robust quality model capable to reliably determine whether the SERS/SERRS taggant has been identified or not within the marking. In case the taggant is identified as genuine in a marking, the marking itself is considered as genuine and more generally, a value document comprising this marking (applied on the substrate of this value document) is considered as genuine.

The additional/non-desirable spectral information in the raw spectral data acquired by the Raman spectrometer is splitted into two sub-spectral categories which respectively relate to the above mentioned "known spectral data" and "unknown spectral data", in order to improve the signal over noise ratio (SNR) and provide a fast and reliable check of the presence of SERS/SERRS taggant on a marking applied on value documents compatible with high-speed sorting devices. The known spectral data is used to model the measured spectral information while the unknown spectral data, which are anticipated to be "low frequency" data, are modeled with mere polynomials (e.g. Legendre polynomials, or Jacobi, Gegenbauer, Zernike, Chebyshev, Romanovski polynomials).

Figure 1:
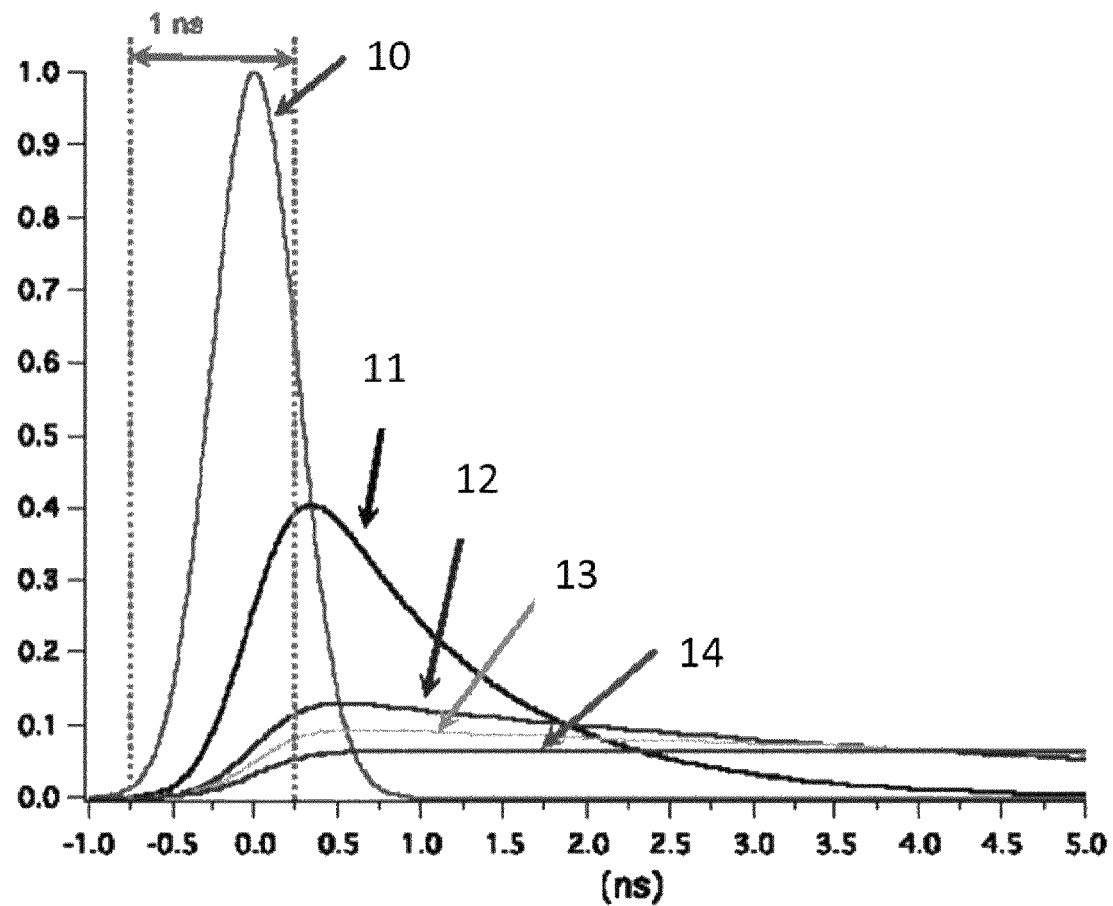
FIG. 1 illustrates relative lifetimes (not to scale) of Raman and photoluminescence signals (including fluorescence).
Figure 2:
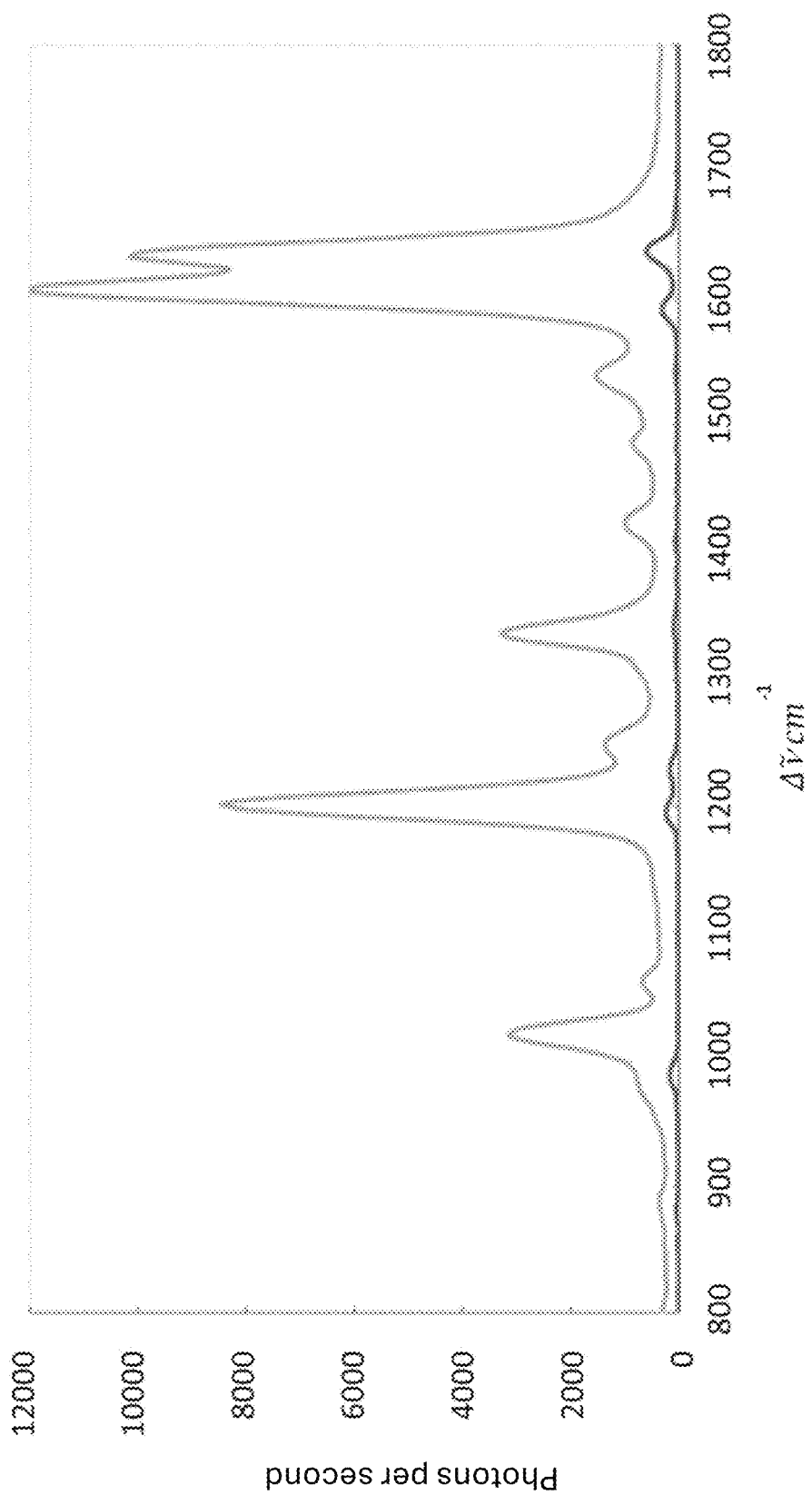
FIG. 2 illustrates a Raman spectrum of a SERS taggant to show the effect of intensity enhancement of Raman scattered light due to the structure of the SERS particle.
Figure 3:
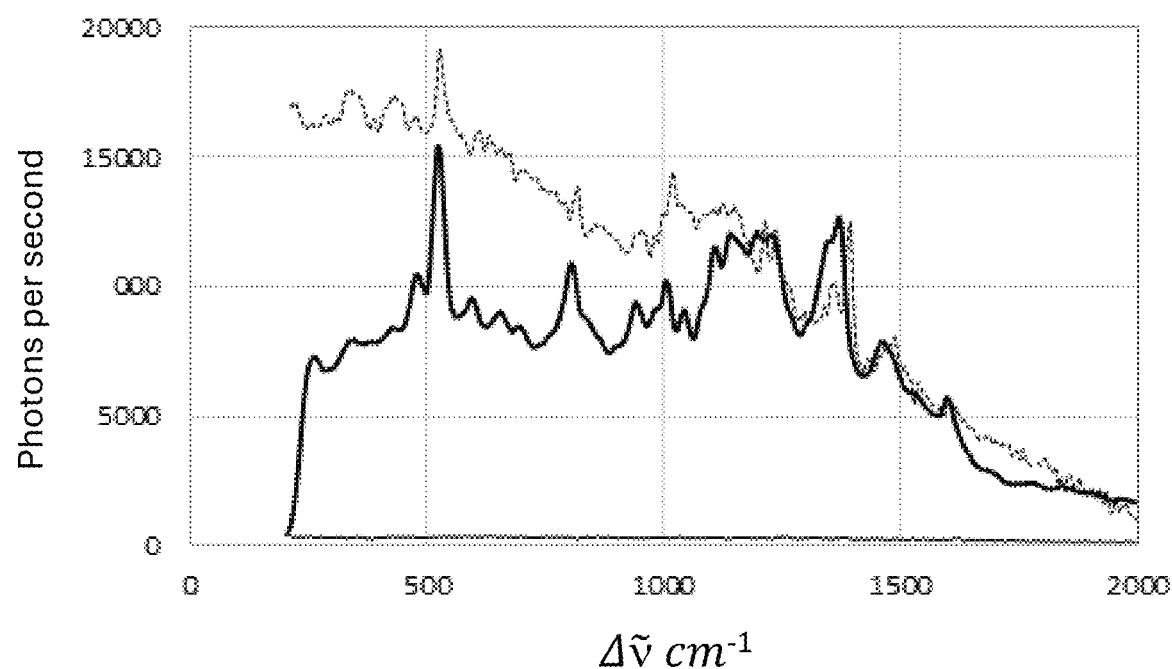
FIG. 3 illustrates a Raman spectrum of a SERRS taggant.

The spectral enhancement effect due to the very structure of an example of SERS taggant is illustrated in FIG. 2, with a Raman spectrum and a SERS spectrum (scattering intensities are plotted versus Raman shift in $cm^{-1}$), and the spectral enhancement effect due to the very structure of an example of SERRS taggant is illustrated in FIG. 3 (wherein the Raman spectrum is scaled by a factor of 8 to better overlap with the SERRS spectrum). On both figures the characteristic enhanced Raman scattering intensity peaks are clearly visible and are so specific to the very structure of the nanoparticles forming the taggant that they constitute identifying features (i.e. they are the taggant's "fingerprint").

According to an illustrative embodiment of the invention, a marking (a pattern) to be authenticated is printed on paper substrate of a banknote with several inks. In case the marking (and thus, the banknote) is genuine, each (genuine) ink composition is known, and a genuine SERS taggant, of which (reference) Raman spectrum is known, has been added to one of these inks to be printed on the banknote. The ink including the SERS taggant corresponds to the above mentioned first material, and the above mentioned second material corresponds to the other ink(s). In this particular embodiment, there are four distinct inks (each having its specific composition) present in the marking, and each ink, if genuine and without inclusion of the taggant, has a known (reference) Raman spectrum. The reference Raman spectra of a genuine SERS taggant, a reference genuine paper substrate (of a corresponding genuine banknote), and each one of the four reference genuine inks can be measured with a Raman spectrometer upon illumination of, respectively, the genuine SERS taggant, the reference genuine paper substrate, and each of the four reference genuine inks with an excitation light (here, a laser light). These reference Raman spectra are then used to derive a full model of the Raman spectrum of a generic genuine marking as linear combination of the different reference spectra. Each reference spectrum corresponds to the acquisition via a Raman spectrometer of certain number of values of scattered light intensity at different wavelengths. Thus, an interpolated reference spectral curve giving the measured scattered intensity I as depending on the wavelength $\lambda$, i.e. $I(\lambda)$, can be obtained for each of the above mentioned genuine SERS taggant, reference genuine paper substrate, and four reference genuine inks. For simplicity, we suppose that a same number n (e.g. n=1024) of reference intensity values (corresponding to n distinct wavelength values) are extracted from each reference spectral curve.

In the full model of the Raman spectrum of a generic genuine marking (with the four genuine inks) applied on a (genuine) substrate, a (discrete) representation of the spectral curve comprises n Raman intensity values $I_i$, i=1, . . . , n, (taken along the spectral curve), and each intensity value $I_i$ is modeled as a linear combination of (p1−1) reference Raman intensity values $X_{i2}$, . . . , $X_{ip1}$, (as $X_{i1} \equiv 1$, for i=1, . . . , n), with p1=7 in the particular embodiment (p1 is the number of independent variables in the model). We thus have: $I_i = \beta_1 X_{i1} + \beta_2 X_{i2} + \ldots + \beta_7 X_{i7}$, wherein $\beta_1, \ldots, \beta_7$ are weights and $X_{i2}$, i=1, . . . , n, are n intensity values at selected representative points along the (normalized) reference Raman spectrum of the genuine SERS taggant. The selected points are in a wavelength band of about 150 nm width in the NIR range (Near-Infrared, 750-1400 nm). Normalization of the spectral curve is obtained by removing the offset value (the data being generally not centered at 0 on the ordinate axis) by taking the difference between the measured value and the minimum of the measured values and by setting the highest peak value to say 1000.

$X_{i3}$, i=1, . . . , n, are n intensity values at selected representative points along the (normalized) reference Raman spectrum of the reference genuine paper; and $X_{i4}, \ldots, X_{i7}$, i=1, . . . , n, are respective n intensity values at selected representative points along the (normalized) reference spectra of the respective four reference genuine inks used to print a genuine marking (each of the four reference genuine inks is considered alone, i.e. without including the SERS taggant).

In vectorial notation, a vector I can be associated with the n scalar components $I_i$, i=1, . . . , n; a vector $\beta$ can be associated with the p1 (here, p1=7) scalar weights $\beta_1, \beta_2, \ldots, \beta_{p1}$, and a (n×p1) matrix X can be associated with the full model, of which first column comprises the n values $X_{i1}=1$ (i=1, . . . , n), and the second to the p1-th column are respectively formed by the components $X_{i2}$ (i=1, . . . , n), . . . , $X_{ip1}$ (i=1, . . . , n). Thus, the representation of a Raman spectrum in the full model is: $I = X \beta$.

According to the invention, a "reduced" marking is a marking applied on the (genuine) paper substrate that differ from a genuine marking only by the fact that it does not include a (genuine) SERS taggant. In a reduced model of a Raman spectrum of such a reduced marking we thus have n Raman intensity values $J_i$, i=1, . . . , n, taken on the spectral curve that are modeled as a linear combination of (p2−1) reference Raman intensity values (as $Z_{i1} \equiv 1$, for i=1, . . . , n)

$Z_{i2}, \ldots, Z_{ip2}$: with here p2=6. We thus have: $J_i=\mu_1 Z_{i1}+\mu_2 Z_{i2}+\ldots+\mu_6 Z_{i6}$, wherein $\mu_1, \ldots, \mu_6$ are weights and $Z_{i2}$, i=1, ..., n, are n intensity values at selected representative points along the (normalized) reference Raman spectrum of the reference genuine paper; and $Z_{i3}, \ldots, Z_{i6}$, i=1, ..., n, are respective n intensity values at selected representative points along the four (normalized) reference spectra of the respective four inks used to print a reduced marking (of course, without including the SERS taggant).

In fact, by definition of the reduced model, we have here (for i=1, ..., n): $Z_{i1}=X_{i1}=1$, and $Z_{ik}=X_{i(k+1)}$, for k=2, ..., p2.

In vectorial notation, a vector J can be associated with the n scalar components $J_i$, i=1, ..., n; a vector $\mu$ can be associated with the p2 (here, p2=6) scalar weights $\mu_1$, $\mu_2, \ldots, \mu_{p2}$, and a (n×p2) matrix Z can be associated with the reduced model, of which first column comprises the n values $Z_{i1}=1$ (i=1, ..., n), and the second to the p2-th column are respectively formed by the components $Z_{i2}$ (i=1, ..., n), ..., $Z_{ip2}$ (i=1, ..., n). Thus, the representation of a Raman spectrum in the reduced model is: J=Z μ.

The marking on the banknote to be authenticated is illuminated with the laser excitation light and a corresponding Raman light signal scattered by the marking is measured with a Raman spectrometer to obtain a measured Raman spectrum of the marking. Preferably, a Raman spectrometer equipped with a multimode laser source (MML) is used. Indeed, even if it is common practice to use a single mode laser (SML) source to obtain the best possible resolution, experience shows that using a MML source in fact improves the speed of detection. For example, the laser power can be increased by a factor of ten (without any compromise) with respect to a SML source, while the integration time of the measurement is reduced by a factor of ten (e.g. instead of 2 ms we can reach 0.2 ms). This is due to two major differences between the SML and MML sources: the laser power (e.g. SML are around 100 mW at 760 nm, when MML are much higher, say around 1 W), and the linewidth (SML are around 0.02 nm when MML are 0.08 nm).

This measured Raman spectrum gives a measured (Raman) scattered light intensity Y as a function of scattered light wavelength λ, i.e. Y(λ). The Raman spectrometer has a plurality of spectral channels and the Raman light signal scattered by the marking and collected by the spectrometer is first dispersed in these spectral channels (via a grating), and an imaging unit (a CCD) acquires a two-dimensional digital image of the corresponding dispersed spectral data as a two-dimensional array of intensity values vs wavelengths, i.e. two-dimensional spectral data. As the acquired two-dimensional spectral data from the Raman spectrometer are raw, they are further pre-processed mainly for reducing the amount of data to be subsequently analyzed by a processing unit (to reduce the processing time and be compatible with banknote detection in high-speed sorters), improving the signal over noise ratio (SNR) and precisely locating the Raman band of the taggant fingerprint.

The pre-processing step of the two-dimensional digital image acquired by the imaging unit is performed by the processing unit, equipped with a memory, and comprises the operations of:

1) Transforming the acquired two-dimensional spectral data into a one-dimensional spectral data by means of line binning and conversion of binned data into wavelength data. This transformation strongly reduces the amount of data to be processed, and improves the SNR (the noise is typically decreased by a factor of the square root of the amount of pixels in a column of the two-dimensional digital image).

2) Resampling the obtained one-dimensional spectral data to form a one-dimensional spectrum having data points equally distant in wavelength. This operation is performed via spline or polynomial interpolation of the spectral data. This resampling has the advantage of reducing the spectrum compression along the abscissa axis and also provides a linear resolution of the spectrum which allows to use well-known signal processing tools (low pass filtering by FFT convolution, FIR convolution etc.).

3) Calibrating the resampled one-dimensional spectrum with respect to a reference white light spectrum (e.g. from a Quartz Tungsten Halogen lamp, in order to balance the sensitivity of the Raman spectrometer), which is stored in the memory, to obtain a calibrated (one-dimensional) spectrum. This operation allows to balance the light intensity delivered by the Raman spectrometer (as in general, the spectrometer outputs different values for a same light intensity at different wavelengths).

4) Filtering with a low-pass filter the calibrated spectrum to obtain a filtered spectrum. Indeed, the undesired very high frequencies noise in the spectral data is mainly due to the imaging unit (i.e. its image sensor and its circuitry), and is known to be a measurement artifact. This filtering can be done via different methodologies like using a Moving Average Filter, or a FFT (Fast Fourier Transform) filter, or a Savitzky-Golay filter. Preferably, the FFT filtration is used (since this method can also be used for alignment of the spectrum).

5) Aligning in wavelength the filtered spectrum with the reference spectrum of the genuine taggant stored in the memory. Indeed, the stored reference Raman spectrum of the genuine taggant is generally not aligned with the Raman spectrum as measured from the marking due to many possible causes, e.g. dilatation of the spectrometer, variation in temperature impacting the light source wavelength and/or the grating, mechanical perturbations due to vibrations etc. Thus, in order to have the best possible validation of the taggant fingerprint, the measurement Raman spectrum obtained from the marking is aligned in wavelength with the reference spectrum. This alignment can be realized by different methods, e.g. such as:

by running the algorithm at different shift increments and pick the best position on the wavelength axis;
  by running the algorithm at different shift increments and interpolate to find the best position on the wavelength axis;
  preferably, by performing, in the frequency domain, a convolution with the taggant fingerprint;
  by monitoring the position of the light source during the measurement from the marking.

As a result of the above operations, a pre-processed Raman spectrum is obtained from two-dimensional spectral data acquired by the imaging unit.

A (discrete) representation of the spectral curve Y(λ) of the pre-processed Raman spectrum comprises n (pre-processed) Raman intensity values $Y_i$, i=1, ..., n, (taken along the spectral curve), and a (n-dimensional) vector Y can be associated with the n scalar components $Y_i$, i=1, ..., n.

In order to fit the (pre-processed) Raman spectrum with the full model, the spectrum (measurement) vector Y is decomposed as Y=I+ε (linear regression analysis), with the first spectrum vector I=X β, where X is the n×p1 (design)

matrix of the full model, $\beta$ is the corresponding first weight vector and $\varepsilon$ is an error vector, or residual vector, with components $\varepsilon_i$, i=1, . . . , n. The values of components $\beta_k$ (k=1, . . . , p1; here p1=7) of the first weight vector $\beta$ that minimize the error vector $\varepsilon$ can be determined via different known optimization methods. For example, it is possible to calculate (iteratively) the residual vectors for a plurality of selected values of the components of the vector $\beta$, and pick the vector $\beta$ corresponding to the residual vector having the lower norm. Another method is to use well known optimization algorithm, like e.g. the simplex algorithm of Dantzig. Preferably, we use the method of Least Square Residual (LSR) which has the advantage of being less intensive in terms of CPU calculation, and thus is better suited authentication of markings on banknotes in high speed sorting machines.

In the same way, in order to fit the (pre-processed) Raman spectrum with the reduced model, the vector Y is decomposed as Y=J+$\varepsilon$', with the second spectrum vector J=Z $\mu$, where Z is the n×p2 (design) matrix of the reduced model, $\mu$ is the corresponding second weight vector and $\varepsilon$' is an error vector, or residual vector, with components $\varepsilon'_i$, i=1, . . . , n. The values of components $\mu_m$ (m=1, . . . , p2; here p2=(p1−1)=6) of the second weight vector $\mu$ that minimize the error vector $\varepsilon$' can be determined via the method of Least Square Residual (LSR).

According to the LSR method, the least square parameter estimates of $\beta$ for the full model (resp. of $\mu$, for the reduced model) in view of the measurements Y are obtained from the p1 (resp. p2) normal equations:

$\varepsilon_i = Y_i - \beta_1 X_{i1} + \beta_2 X_{i2} + \ldots + \beta_{p1} X_{ip1}$ (i=1, . . . ,n), i.e.
$\varepsilon = Y - X\beta$, and $\Sigma_{i=1}^n \Sigma_{i=1}^{p2} X_{ij} X_{ik} \beta_k = \Sigma_{i=1}^n X_{ij} Y_i, j=1, \ldots, p1;$ or, respectively, $\varepsilon'_i = Y_i - \mu_1 Z_{i1} + \mu_2 Z_{i2} + \ldots + \mu_{p2} Z_{ip2}$ (i=1, . . . ,n), i.e.
$\varepsilon' = Y - Z\mu$, and $\Sigma_{i=1}^n \Sigma_{k=1}^{p2} Z_{ij} Z_{ik} \mu_k = \Sigma_{i=1}^n Z_{ij} Y_i, j=1, \ldots, p2.$ The LSR method provides a solution which minimizes the square residual, i.e.

$$\tilde{\beta} = \min_{\beta} \|\varepsilon\|^2$$

for the full model, and $$\tilde{\mu} = \min_{\mu} \|\varepsilon'\|^2$$

for the reduced model. If we suppose that columns of the design matrix of the full model X are linearly independent, we can use the (left) pseudoinverse $X^+$ of this design matrix X of the full model with $X^+ = (X^T X)^{-1} X^T$, where $X^T$ is the transposed of X, and write $\tilde{\beta} = X^+ Y$ (and we have $X^+ X = Id$). In case the rows of the design matrix of the full model X are linearly independent, we can use the (right) pseudoinverse $X^+$ if this matrix X with $X^+ = X^T (X X^T)^{-1}$, and still write $\tilde{\beta} = X^+ Y$ (and we have $X X^+ = Id$). In practice, we use the Singular Value Decomposition (SVD) method for calculating the pseudoinverse of the design matrix in order to have a stable and fast calculation. In the same way, we calculate the pseudoinverse $Z^+$ of the design matrix of the reduced model Z and write $\tilde{\mu} = Z^+ Y$. These pseudoinverse matrices are preferably pre-calculated (once the corresponding design matrices are known) and stored in the memory of the processing unit. Once the first weight vector $\tilde{\beta}$ and the second weight vector $\tilde{\mu}$ are determined, the statistical significance of these estimated weights of the two models (in view of the same measurement vector Y), i.e. the quality of the full model versus the reduced model, can be checked by performing a classical F-test.

Figure 5:
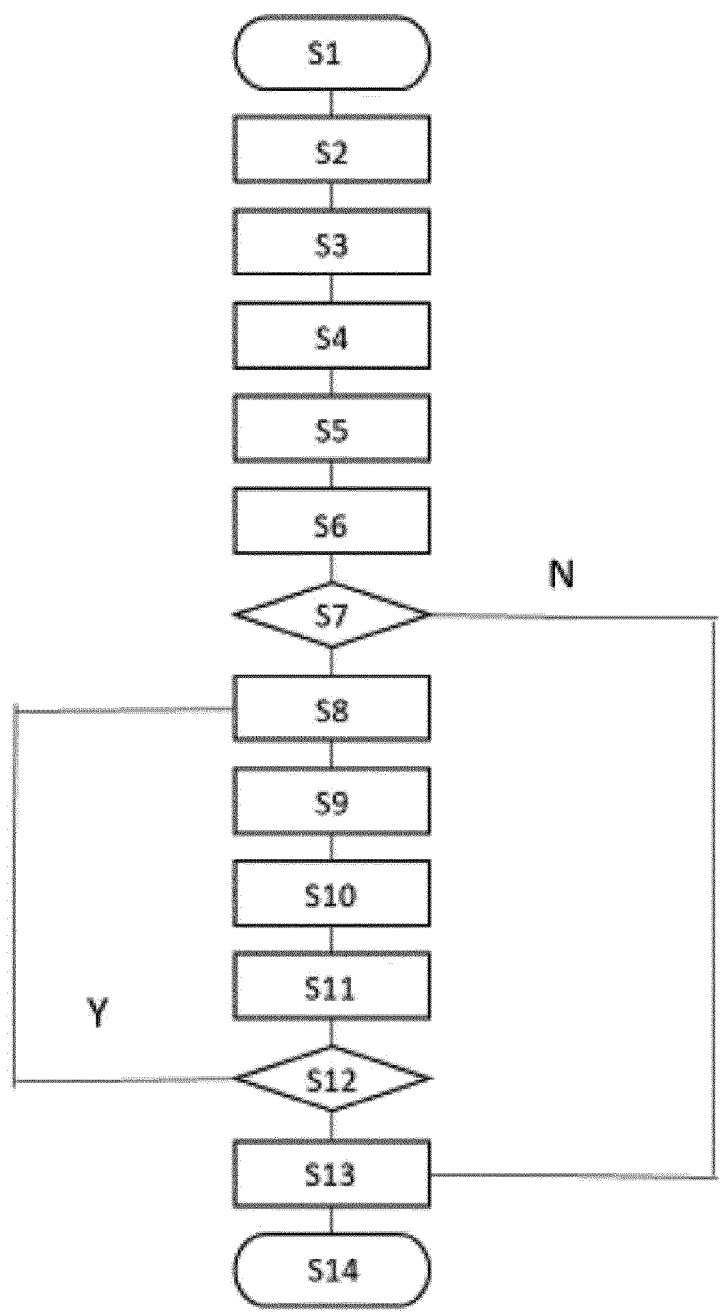
FIG. 5 is a flowchart illustrating the non-negativity constraint method according to the invention.

However, a problem with the above mentioned LSR method is that it does not consider whether the obtained solution is "feasible". Indeed, in case the solution involves a negative value of a weight component $\beta_j$ (j∈{2, . . . , 7}) of the vector $\beta$, or a weight component $\mu_r$ (r∈{2, . . . , 6}) of the vector $\mu$, then the intensity of the related spectral component would be negative, which is physically not possible (this would constitute a non-feasible solution). It has been observed that the authentication method is much more robust when specific minimization methods are used in order to comply with the non-negativity constraint (NNC) on the values of the weights. Some methods integrating said non-negativity constraint are known: e.g. the Active-Set method (detailed in the book of Charles L. Lawson and Richard J. Hanson, "Solving Least Square Problems, SIAM 1995), or the Landweber's gradient descent method. According to the invention, the LSR method is combined with the following method, illustrated in FIG. 5 to comply with the non-negativity constraint. This will be explained in the case of the full model with p1=7 weights, and can be directly transposed, mutatis mutandis, to the case of the reduced model (with p2=6 weights). The method of calculating the values of the p1 components $\beta_1, \ldots, \beta_7$ of the weight vector $\tilde{\beta}$ starts (S1) by calculating them from the pseudoinverse matrix $X^+$ and the spectrum measurement vector Y stored in the memory of the processing unit, i.e. with $\tilde{\beta} = X^+ Y$, then a check (S2) is performed to determine whether there is any negative weight value in the initially calculated weight vector $\tilde{\beta}$. In the example shown in FIG. 5, two weights $\beta_2$ and $\beta_6$ have negative values (respectively corresponding to the SERS taggant and the third ink), then the value of the weight $\beta_2$ is set to zero (S3) and the corresponding column of the design matrix X, i.e. the column corresponding to the Raman spectrum of the (genuine) SERS taggant (with components $X_{12}, \ldots, X_{n2}$), is removed (S4) from the (initial) design matrix X, and a new n×(p1−1) design matrix X' is thus obtained. A corresponding new pseudoinverse matrix $X'^+$ is then calculated (S5) and used to calculate (S6) a new weight vector $\tilde{\beta}'$, with $\tilde{\beta}' = X'^+ Y$: this new weight vector has only (p1−1) components $\beta'_1, \beta'_3, \beta'_4, \beta'_5, \beta'_6$ and $\beta'_7$ (as we have set $\beta_2$ to zero). Then a check (S7) is performed to determine whether there is any negative weight value (yes "Y") in the calculated weight vector $\tilde{\beta}'$ or not (no "N"). In the example shown in FIG. 5, one weight $\beta'_6$ has a negative value (corresponding to the third ink), then the value of the weight $\beta'_6$ is set to zero (S8), and the corresponding column of the design matrix X', i.e. the column corresponding to the Raman spectrum of the (reference genuine) third ink (with components $X_{16}, \ldots, X_{n6}$), is removed (S9) from the design matrix X', and a new n×(p1−2) design matrix X" is thus obtained. A corresponding new pseudoinverse matrix $X''^+$ is then calculated (S10) and used to calculate (S11) a new weight vector $\tilde{\beta}''$, with $\tilde{\beta}'' = X''^+ Y$: this new weight vector has only (p1−2) components $\beta''_1, \beta''_3, \beta''_4, \beta''_5,$ and $\beta''_7$ (as we have set $\beta_2$ and $\beta'_6$ to zero). Then a check (S12) is performed to determine whether there is any negative weight value ("Y") in the calculated weight vector $\tilde{\beta}''$ or not ("N"). In the example shown in FIG. 5, the remaining values of the weight components $\beta''_1$, $\beta''_3$, $\beta''_4$, $\beta''_5$, and $\beta''_7$ are all positive. As a result (S13), the final p1 values of the weight components obtained via the LSR method under non-negativity constraint, i.e. the LSR-NNC method, are $\beta''_1$, 0, $\beta''_3$, $\beta''_4$, $\beta''_5$, 0 and $\beta''_7$, and the calculation stops (S14). In case there is a negative value at step S12 (i.e. Y), then steps (S8) to (S12) are performed accordingly. The LSR-NNC method is also applied to the calculation of the (non-negative) values of the components of the second weight vector $\tilde{\mu} = Z^+ Y$.

Having obtained reliable values (i.e. non-negative values corresponding to physically possible ones) by using the LSR method coupled with the non-negativity constraint (LSR-NNC), for the components of the first weight vector $\tilde{\beta}$ and the second weight vector $\tilde{\mu}$, a reliable F-test can now be performed to compare the quality of the full model versus the reduced model. To achieve this, a F-value is calculated as a ratio of a difference between the second residual sum of squares $RSS2 = \sum_{i=1}^{n}(\varepsilon'_i)^2$ of the reduced model and the first residual sum of squares $RSS1 = \sum_{i=1}^{n}(\varepsilon_i)^2$ of the full model divided by a difference (p2−p1) between the numbers p2 and p1, and the first residual sum of squares RSS1 divided by a difference between a number n (here, n=1024) of components of the spectrum measurement vector Y and the number p1, $F = ((RSS2-RSS1)/(p1-p2))/(RSS1/(n-p1))$. Thus, $F = [(RSS2-RSS1)/RSS1] \times K$, with a factor $K \equiv (n-p1)/(p1-p2)$. In the example considered, we have the same number of data points, i.e. n, for both models. The full model (model 1) has one more parameter with respect to the reduced model (model 2). As usual, the model with more parameters will always be able to fit the data at least as well as the model with fewer parameters, and the F-test will determine whether the full model gives a significantly better fit of the data than the reduced model (without the taggant). From the above classical formula, we obtain a value of the factor K given by $(n-p1)/(p1-p2) = (n-7)/1 = 1017$. The value of F is a number representing the likelihood of having a genuine SERS taggant in the marking.

Generally, the value of F depends on the SNR as follows:
with a low SNR and a presence of the SERS taggant in the marking: the value F is low. This is normal since the random noise has the same impact the fingerprint of the discrimination of the SERS taggant.
with a SNR low and an absence of (genuine) SERS taggant in the marking: the value of F is low.
with a SNR high and a presence of the (genuine) SERS taggant in the marking: the value of F is high.
with a SNR high and an absence of the (genuine) SERS taggant in the marking: the value of F is low.

The trend between the SNR and value F being linear, it is not well suited for deciding on authenticity of a marking when the value of F is between 8000 and 1000000. A further "compression" step can be applied to modify the value of F so as to create a plateau on a curve representing a dependency of the value F with respect to the SNR. In this embodiment, a modified ("compressed") value F' is obtained via the transformation $F' = \text{constant} \times \text{Log}(F)$, for example with the value of the constant factor being 5.

From a series of experiments, it can be reliably concluded that:
a value of F' below a low threshold value (LTV) of about 20 (say, between 1 and 20) corresponds to an absence of (genuine) SERS taggant in the marking, and a negative decision $D^-$ is delivered indicating that the corresponding banknote is not genuine.
a value of F' above a high threshold value (HTV) of about 50 (say, between 50 and 80) indicates a presence of the SERS taggant in the marking, and a positive decision $D+$ is delivered indicating that the corresponding banknote is genuine.
while intermediate values of F' (say, between the low threshold value LTV and the high threshold value HTV) cannot permit to conclude (the result strongly depends on the level of the SNR). In this latter case, as it cannot be decided whether the SERS taggant is present or not in the marking, and thus it cannot be decided whether the banknote is genuine or not: the banknote is retained (R) for a more detailed (e.g. forensic) analysis.

Figure 4:
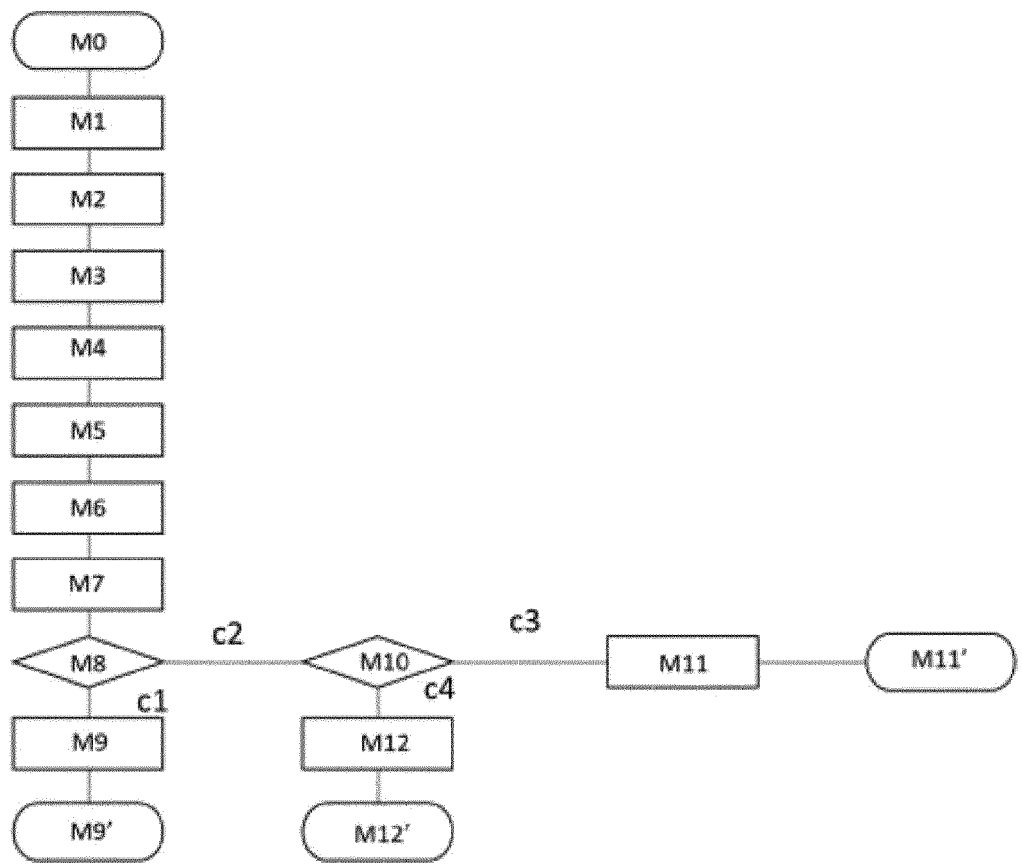
FIG. 4 is a flowchart illustrating an embodiment of the method according to the invention.

The steps of the above preferred embodiment of the method of authenticating a marking applied on a substrate and having a composition including an ink and a SERS taggant (or a SERRS taggant) are summarized in FIG. 4. The method starts (M0) and the values of the number of reference Raman spectra in the full model and in the reduced model p1 (with p1≥4) and p2=(p1−1) are specified and stored in the memory of the processing unit (M1), and the number n of points taken on the measure Raman spectrum. The respective Raman spectra $X_{i2}, \ldots, X_{ip1}$ (i=1, ..., n) of the full model and $Z_{i2}, \ldots, Z_{ip2}$ of the reduced model are specified and the corresponding full design matrix X and reduced design matrix Z are stored at step (M2). The corresponding pseudoinverse $X^+$ of the full design matrix and pseudoinverse $Z^+$ of the reduced design matrix are calculated and stored at step (M3). Then a measured Raman spectrum is acquired from the marking via a two-dimensional image obtained by the imaging unit of the Raman spectrometer (upon illumination of the marking with the excitation laser light), and pre-processed to obtain a one-dimensional spectrum and form a corresponding spectrum measurement vector Y having n components at step (M4). The LSR method together with the NNC method (i.e. LSR-NNC) is performed at step (M5) to calculate the first weight vector $\tilde{\beta} = X^+ Y$ corresponding to the full model and the second weight vector $\tilde{\mu} = Z^+ Y$ corresponding to the reduced model, which minimize, respectively, the square of the first residual vector $\varepsilon$ (i.e. $Y - X \tilde{\beta}$) for the full model and the square of the second residual vector $\varepsilon'$ (i.e. $Y - Z \tilde{\mu}$) for the reduced model. Then, the first residual sum of squares $RSS1 = \sum_{i=1}^{n}(\varepsilon_i)^2$ and the second residual sum of squares $RSS2 = \sum_{i=1}^{n}(\varepsilon'_i)^2$ are calculated, and the corresponding F value is obtained at step (M6), with F=K (RSS2−RSS1)/RSS1 (and K=(n−p1)/(p1−p2)). At step (M7) a compressed value F' is calculated (e.g. with the transformation F'=5 Log(F)). Finally, a decision is taken in view of the compressed value F', and the stored values HTV (high threshold value) and LTV (low threshold value) that are convenient for the marking:
at step (M8), the value F' is compared with the value HTV: if F' is greater than HTV (condition c1), a positive decision $D^+$ is delivered at step (M9), i.e. the banknote having the marking is genuine (and the calculation stops (M9')); if F' is less or equal to HTV (condition c2) then,
at step (M10), the value of F' is compared with the value LTV: if F' is less than LTV (condition c3), a negative decision $D^-$ is delivered at step (M11), i.e. the banknote having the marking is not genuine (and the calculation stops (M11')); if F' is greater or equal to LTV (condition c4), then the banknote is retained (R) at step (M12) for further analysis (and the calculation stops at (M12')).

In case the marking comprises a plurality of SERS taggants, or SERRS taggants, a decision on authenticity only based on a single F value may not be reliable enough.

According to the invention, it is possible to use a plurality of different reduced models and calculate a different F values for comparing the full model of a genuine marking (i.e. comprising the plurality of reference spectra of the various taggants) with each one of the reduced models. For example, the different reduced models may correspond to a marking differing from a genuine marking only by the absence of one of the different taggants of the genuine marking. These F values are obtained from a (pre-processed) spectrum vector Y obtained from a measured Raman spectrum of the marking to be authenticated by applying the above mentioned LSR-NNC method to find the different weight vectors minimizing the squares of the corresponding residual vectors. A decision on genuineness of a marking must involve different threshold rules for each of the calculated F values, which results in a certain complexity. In this case, a decision on genuineness may be preferably based on a decision tree incorporating said threshold rules.

Figure 6:
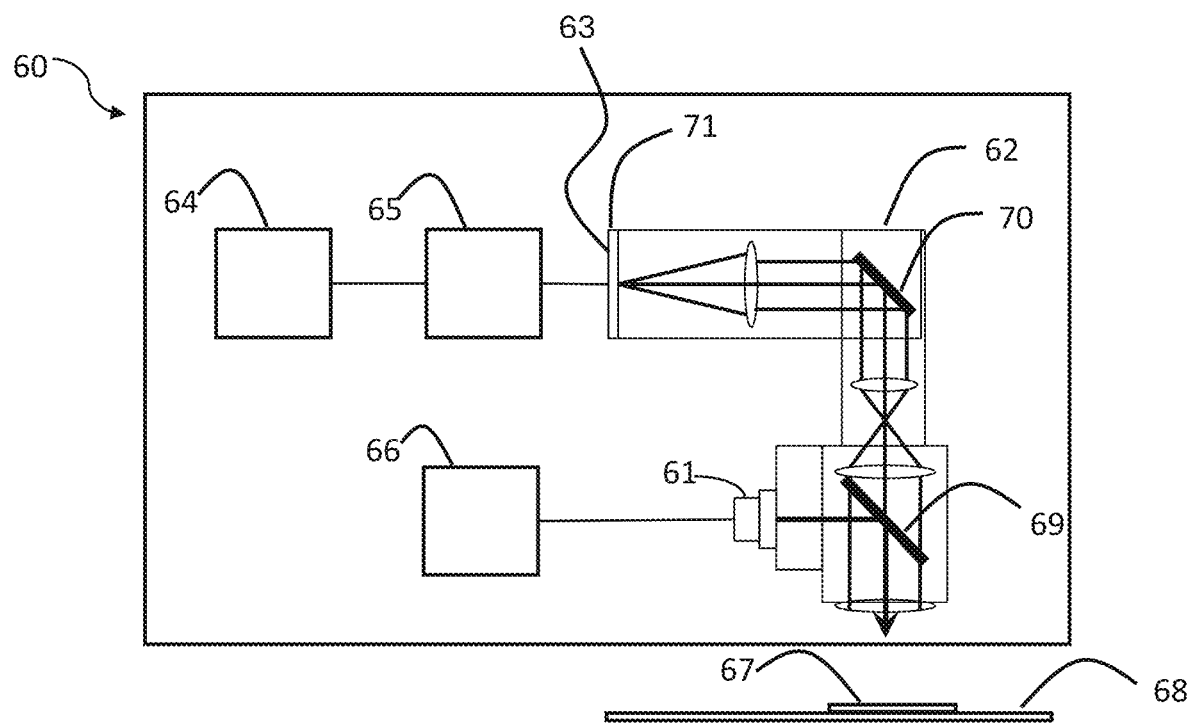
FIG. 6 is a schematic view of a system including a Raman spectrometer according to an embodiment of the invention.

The invention also relates to a system (60), of which a particular embodiment is illustrated in FIG. 6, comprising a light source (61), a Raman spectrometer (62), an imaging unit (63), a processing unit (64), a memory unit (65) and a control unit (66). The control unit (66) controls the light source (61) (here, a laser) via a current loop to deliver a calibrated excitation light and illuminate a marking (67) on a banknote (68) to be authenticated, when the (moving) marking arrives at the level of the imaging unit (63). The laser excitation light is delivered via a dichroic mirror (69) to the marking (67). In response to the illumination, a Raman light is scattered from the marking, collected via the dichroic mirror (69) and dispersed via a grating (70) toward a CCD sensor (71) of the imaging unit (63). A corresponding two-dimensional digital image of the collected Raman spectrum is formed by the imaging unit (63) and constitutes the 2D measured Raman spectrum which is stored in the memory unit (65). The memory unit (65) stores the full model of a genuine marking (applied on a genuine substrate of a genuine banknote), i.e. the number n of points of the selected reference spectra, the number p1 of weights forming a first weight vector $\beta$, and the number p2 of weights forming a second weight vector $\mu$, as explained above. The reference spectra of the full model are stored as components of a full (design) matrix X, and the reference spectra of the reduced model are stored as components of a reduced (design) matrix Z. The memory unit (65) further stores the reduced model, the pre-calculated pseudoinverses $X^+$ and $Z^+$ of, respectively, of the matrix X and the matrix Z. The stored two-dimensional measured Raman spectrum is pre-processed via the processing unit (64) as explained above to obtain a (one-dimensional) pre-processed spectrum under the form of a spectrum measurement vector Y having n components, which is stored in the memory unit (65). The processing unit (64) then calculates the first weight vector $\hat{\beta}=X^+ Y$ corresponding to the full model, which minimizes the square of the first residual vector $\varepsilon=Y-X\beta$, and calculates the second weight vector $\hat{\mu}=Z^+ Y$, which minimizes the square of the second residual vector $\varepsilon'=Y-Z\mu$, and stores in the memory unit (65) the calculated residual vectors. The memory unit also stores the values of the parameters HTV and LTV, respectively corresponding to the high threshold value and the low threshold value to be considered with a F-test for the full and reduced model. The first residual sum of squares $RSS1=\Sigma_{i=1}^{n}(\varepsilon_i)^2$ and the second residual sum of squares $RSS2=\Sigma_{i=1}^{n}(\varepsilon'_i)^2$, respectively associated with the full model and the second model, are calculated by the processing unit (64), and the corresponding F value of a F-test is further calculated by the processing unit (64) as $F=K\ (RSS2-RSS1)/RSS1$, with $K=(n-p1)/(p1-p2)$. The processing unit (64) calculates a compressed F' value as $F'=5\ Log(F)$, and stores this value in the memory unit (65). The processing unit (64) finally delivers a decision (preferably displayed on a screen) based on the stored value F' and the stored values of the parameters HTV and LTV, upon comparison of the value F' with HTV and LTV (as explained above). In case the marking is considered as not genuine (corresponding to a negative decision D⁻), the corresponding banknote is retained as counterfeited. In case F' LTV, the banknote is considered as suspicious and retained for further (forensic) analysis.

The above disclosed subject matter is to be considered illustrative, and not restrictive, and serves to provide a better understanding of the invention defined by the independent claims.

The invention claimed is:

1. A method of authenticating a marking applied on a substrate and having a composition comprising a first material including a SERS taggant, or a SERRS taggant, comprising the following steps performed by a system comprising a light source, a Raman spectrometer, an imaging unit and a control unit having a processing unit and a memory, the light source being controlled by the control unit via a current loop to deliver a calibrated excitation light:

storing in the memory a full model of a Raman spectrum of a genuine marking applied on a genuine substrate and having a composition comprising a genuine first material including a genuine SERS taggant, or a genuine SERRS taggant, as a first weighted sum of a reference Raman spectrum of the genuine taggant, a reference Raman spectrum of a reference genuine substrate that is not marked with the genuine taggant, and a reference Raman spectrum of a reference genuine first material not including the genuine taggant, collected upon respective illumination of the genuine taggant, the reference genuine substrate, and the reference genuine first material with excitation light;

storing in the memory a reduced model of a Raman spectrum of a reduced marking, the reduced marking differing only from the genuine marking by its composition not including the genuine taggant, as a second weighted sum of the reference Raman spectrum of the reference genuine substrate, and the reference Raman spectrum of the reference genuine first material;

upon illuminating the marking with the excitation light, measuring a corresponding Raman light signal scattered by the marking via a Raman spectrometer to obtain a measured Raman spectrum of the marking;

by the processing unit:

fitting the measured Raman spectrum with the full model of the Raman spectrum by calculating values of the weights in the full model that minimize, under non-negativity constraint of said weights, a difference between the full model and the measured Raman spectrum and obtaining a corresponding first residual;

fitting the measured Raman spectrum with the reduced model of the Raman spectrum by calculating values of the weights in the reduced model that minimize, under non-negativity constraint of said weights, a difference between the reduced model and the measured Raman spectrum and obtaining a corresponding second residual;

calculating a F-value corresponding to a F-test of comparison of the full model and the reduced model for the measured Raman spectrum from the obtained first residual and second residual; and deciding whether the taggant is present or not in the marking based on the calculated F-value.

2. The method according to claim 1, wherein during the operation of measuring the Raman light signal scattered by the marking, the marking is moving relative to the Raman spectrometer.

3. The method according to claim 1, wherein the composition of the marking includes a second material and the respective weighted sums of the full model and the reduced model further include a reference spectrum of a corresponding genuine second material, collected upon illumination of said genuine second material with the excitation light, with corresponding weight.

4. The method according tom claim 1, wherein the Raman spectrometer has a plurality of spectral channels and the operation of measuring the Raman light signal scattered by the marking comprises:

dispersing the collected Raman light in the plurality of spectral channels and acquiring a two-dimensional digital image of the dispersed spectral data with the imaging unit;

pre-processing the acquired two-dimensional digital image by performing with the processing unit the operations of:

transforming the two-dimensional spectral data into a one-dimensional spectral data via line binning and conversion of binned data into wavelength data;

resampling the one-dimensional spectral data to obtain a one-dimensional spectrum with data points equally distant in wavelength;

calibrating the one-dimensional spectrum with respect to a reference white light spectrum stored in the memory to obtain a calibrated spectrum;

filtering with a low-pass filter the calibrated spectrum to obtain a filtered spectrum; and aligning in wavelength the filtered spectrum with the reference spectrum of the taggant stored in the memory, thereby obtaining a pre-processed spectrum; and performing the operations of calculating the first residual and the second residual by using the pre-processed spectrum as the measured Raman spectrum.

5. The method according to claim 4, comprising:

defining a spectrum measurement vector as a vector corresponding to the obtained pre-processed spectrum;

defining a first spectrum vector as a product of a first weight vector and a full design matrix and determining respective non-negative components of the first weight vector that minimizes via a least square method a first residual vector corresponding to a difference between said first spectrum vector and the spectrum measurement vector, the full design matrix having columns respectively representing the reference spectral data of the full model;

defining a second spectrum vector as a product of a second weight vector and a reduced design matrix and determining respective non-negative components of the second weight vector that minimizes via a least square method a second residual vector corresponding to a difference between said second spectrum vector and the spectrum measurement vector, the reduced design matrix having columns respectively representing the reference spectral data of the reduced model;

calculating a first residual sum of squares RSS1 of errors corresponding to the first weight vector, the first weight vector having a number p1 of non-negative components;

calculating a second residual sum of squares RSS2 of errors corresponding to the second weight vector, the second weight vector having a number p2 of non-negative components; and calculating the F-value as a ratio of a difference between the second residual sum of squares RSS2 and the first residual sum of squares RSS1 divided by a difference between the numbers p2 and p1, and the first residual sum of squares RSS1 divided by a difference between a number N of components of the spectrum measurement vector and the number p1, $F=((RSS2-RSS1)/(p1-p2))/(RSS1/(N-p1))$.

6. The method according to claim 5, wherein determining respective non-negative components of the first weight vector and the second weight vector comprises representing the first weight vector minimizing the first residual vector as a product of a pseudo-inverse matrix of the full design matrix and the spectrum measurement vector, and representing the second weight vector minimizing the second residual vector as a product of a pseudo-inverse matrix of the reduced design matrix and the spectrum measurement vector; and in case a component of, respectively, the first weight vector or the second weight vector has a negative value:
modifying, respectively, the full design matrix or the reduced design matrix by removing from said matrix a spectral vector corresponding to said negative component;
setting to zero of said negative value component; and
recalculating, respectively, a pseudo-inverse matrix of the modified full design matrix or the modified reduced design matrix, until the obtained components of the first weight vector and the second weight vector have only non-negative values.

7. A system for authenticating a marking applied on a substrate and having a composition comprising a first material including a SERS taggant, or a SERRS taggant, the system comprising a light source, a Raman spectrometer, an imaging unit and a control unit having a processing unit and a memory, the light source being controlled by the control unit via a current loop to deliver a calibrated excitation light, the system being configured to perform the operations of:

illuminating the marking with the excitation light delivered by the light source controlled by the control unit; and collecting a resulting Raman light from the marking, and dispersing the collected Raman light in the Raman spectrometer having a plurality of spectral channels and acquiring a two-dimensional digital image of the corresponding spectral data with the imaging unit, and storing in the memory the acquired spectral data as a measured Raman spectrum of the marking;

wherein:

the memory stores a full model of a Raman spectrum of a genuine marking applied on a genuine substrate and having a composition comprising a genuine first material including a genuine SERS taggant, or a genuine SERRS taggant, as a first weighted sum of a reference Raman spectrum of the genuine taggant, a reference Raman spectrum of a reference genuine substrate that is not marked with the genuine taggant, and a reference Raman spectrum of a reference genuine first material not including the genuine taggant collected upon respective illumination of the genuine taggant, the reference genuine substrate, and the reference genuine first material with excitation light;

the memory stores a reduced model of a Raman spectrum of a reduced marking, the reduced marking differing only from the genuine marking by its composition not including the genuine taggant, as a second weighted sum of the reference Raman spectrum of the reference genuine substrate, and the reference Raman spectrum of the reference genuine first material; and the system being further configured to perform via the processing unit the operations of:

fitting the measured Raman spectrum stored in the memory with the stored full model of the Raman spectrum by calculating values of the weights in the full model that minimize, under non-negativity constraint of said weights, a difference between the full model and the measured Raman spectrum and obtaining, and storing in the memory, a corresponding first residual;

fitting the measured Raman spectrum stored in the memory with the stored reduced model of the Raman spectrum by calculating values of the weights in the reduced model that minimize, under non-negativity constraint of said weights, a difference between the reduced model and the measured Raman spectrum and obtaining, and storing in the memory, a corresponding second residual;

calculating, and storing in the memory, a F-value corresponding to a F-test of comparison of the full model and the reduced model for the measured Raman spectrum from the stored first residual and second residual; and deciding whether the taggant is present or not in the marking based on the stored F-value, and delivering a signal indicating a result of the decision.

8. The system according to claim 7, wherein during the operation of measuring the Raman light signal scattered by the marking, the marking is moving relative to the Raman spectrometer, and the control unit synchronizes the illumination of the marking with the light source and the acquisition of the measured Raman spectrum via the Raman spectrometer and the imaging unit with the motion of the marking.

9. The system according to claim 7, wherein the composition of the marking includes a second material, the respective weighted sums of the full model and the reduced model further include a reference spectrum of a corresponding genuine second material, collected upon illumination of said genuine second material with the excitation light and stored in the memory, with corresponding weight.

10. The system according to claim 7, wherein the processing unit is configured to perform the operations of pre-processing the stored two-dimensional digital image by
transforming the two-dimensional spectral data into a one-dimensional spectral data via line binning and conversion of binned data into wavelength data;
resampling the one-dimensional spectral data to obtain a one-dimensional spectrum with data points equally distant in wavelength;
calibrating the one-dimensional spectrum with respect to a reference white light spectrum stored in the memory to obtain a calibrated spectrum;
filtering with a low-pass filter the calibrated spectrum to obtain a filtered spectrum;
aligning in wavelength the filtered spectrum with the reference spectrum of the taggant stored in the memory, thereby obtaining, and storing in the memory, a pre-processed spectrum; and
performing the operations of calculating the first residual and the second residual by using the pre-processed spectrum stored in the memory as the measured Raman spectrum.

11. The system according to claim 10, wherein the processing unit is configured to:
define a spectrum measurement vector as a vector corresponding to the obtained pre-processed spectrum;
define a first spectrum vector as a product of a first weight vector and a full design matrix and determine respective non-negative components of the first weight vector that minimizes via a least square method a first residual vector corresponding to a difference between said first spectrum vector and the spectrum measurement vector, the full design matrix having columns respectively representing the reference spectral data of the full model;
define a second spectrum vector as a product of a second weight vector and a reduced design matrix and determine respective non-negative components of the second weight vector that minimizes via a least square method a second residual vector corresponding to a difference between said second spectrum vector and the spectrum measurement vector, the reduced design matrix having columns respectively representing the reference spectral data of the reduced model;
calculate a first residual sum of squares RSS1 of errors corresponding to the first weight vector, the first weight vector having a number p1 of non-negative components, and storing in the memory the calculated first residual sum of squares RSS1 and the number p1;
calculate a second residual sum of squares RSS2 of errors corresponding to the second weight vector, the second weight vector having a number p2 of non-negative components, and storing in the memory the calculated second residual sum of squares RSS2 and the number p2; and
calculate the F-value as a ratio of a difference between the stored second residual sum of squares RSS2 and the stored first residual sum of squares RSS1 divided by a difference between the stored numbers p2 and p1, and the stored first residual sum of squares RSS1 divided by a difference between a number N of components of the spectrum measurement vector and the number p1, $F=((RSS2-RSS1)/(p1-p2))/(RSS1/(N-p1))$.

12. The system according to claim 11, wherein the processing unit is configured to determine respective non-negative components of the first weight vector and the second weight vector by
representing the first weight vector minimizing the first residual vector as a product of a pseudo-inverse matrix of the full design matrix and the spectrum measurement vector;
representing the second weight vector minimizing the second residual vector as a product of a pseudo-inverse matrix of the reduced design matrix and the spectrum measurement vector; and
in case a component of, respectively, the first weight vector or the second weight vector has a negative value:
modifying, respectively, the full design matrix or the reduced design matrix by removing from said matrix a spectral vector corresponding to said negative component;

setting to zero of said negative value component; and recalculating, respectively, a pseudo-inverse matrix of the modified full design matrix or the modified reduced design matrix, until the obtained components of the first weight vector and the second weight vector have only non-negative values and storing the obtained components in the memory.

* * * * *